US011410375B2

(12) United States Patent
Le et al.

(10) Patent No.: US 11,410,375 B2
(45) Date of Patent: Aug. 9, 2022

(54) SYSTEM AND METHOD FOR CONTENT CREATION VIA INTERACTIVE LAYERS

(71) Applicant: Palo Alto Research Center Incorporated, Palo Alto, CA (US)

(72) Inventors: Jacob Le, Palo Alto, CA (US); Gregory Michael Youngblood, Minden, NV (US); Robert Thomas Krivacic, San Jose, CA (US); Jichen Zhu, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/171,949

(22) Filed: Feb. 9, 2021

(65) Prior Publication Data
US 2021/0272352 A1   Sep. 2, 2021

Related U.S. Application Data

(60) Provisional application No. 62/983,450, filed on Feb. 28, 2020.

(51) Int. Cl.
*G06T 17/05* (2011.01)
*G06T 15/08* (2011.01)
*G06T 15/00* (2011.01)
*G06T 17/10* (2006.01)

(52) U.S. Cl.
CPC ............ *G06T 15/08* (2013.01); *G06T 15/005* (2013.01); *G06T 17/05* (2013.01); *G06T 17/10* (2013.01); *G06T 2215/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,790,123 A | * | 8/1998 | Wald | ........................ G06T 17/05 345/419 |
| 8,115,765 B2 | | 2/2012 | Sommers | |
| 9,737,811 B1 | * | 8/2017 | Penmatsa | ................ A63F 13/35 |

(Continued)

OTHER PUBLICATIONS

Smelik et al., "Integrating procedural generation and manual editing of virtual worlds," Jun. 2010, ACM, Article 2, pp. 1-8 (Year: 2010).*

(Continued)

*Primary Examiner* — Andrew G Yang
(74) *Attorney, Agent, or Firm* — Krista A. Wittman

(57) ABSTRACT

A system and method for content creation via interactive layers is provided. Parameters for an artifact are received. A mutable general object on which to build the artifact is maintained and includes a plurality of n-dimensional data units. Layers of data for the artifact are generated via different generators. Each layer of the artifact represents a set of characteristics based on arrangements of the data units. Each layer is generated by obtaining data about an arrangement of the data units for that layer, from one or more layers of the artifact prior to that data layer, and creating the layer to mutate the data units based on the data from one or more prior data layers and the received parameters. The artifact is formed by stacking the layers via the mutable general object. Each data layer is stored with the generator for that layer as a string of characters.

20 Claims, 5 Drawing Sheets

(56) References Cited

U.S. PATENT DOCUMENTS

2005/0264567 A1* 12/2005 Sommers ............... G06T 17/00
  345/423
2020/0258174 A1* 8/2020 Rodriguez ........... G06Q 50/163
2021/0192840 A1* 6/2021 Bosse ................... G01C 21/30

OTHER PUBLICATIONS

Smelik et al., "A declarative approach to procedural modeling of virtual worlds," Apr. 2011, Elselvier, vol. 35, Issue 2, pp. 352-363 (Year: 2011).*

Petrovas et al., "Automated Digital Terrain Elevation Modification by Procedural Generation Approach," Apr. 2019, IEEE, pp. 1-5 (Year: 2019).*

Santamaria-Ibirika Aitor et al., "Procedural approach to volumetric terrain generation," Visual Computer, Springer, Berlin, DE, vol. 30, No. 9, Dec. 28, 2013, pp. 997-1007, XP035380021, ISSN: 0178-2789, DOI: 10.1007/S00371-013-0909-Y.

P. E. Hart, N. J. Nilsson and B. Raphael, "A Formal Basis for the Heuristic Determination of Minimum Cost Paths," in IEEE Transactions on Systems Science and Cybernetics, vol. 4, No. 2, pp. 100-107, Jul. 1968. doi: 10.1109/TSSC.1968.300136 URL: http://ieeexplore.ieee.org/stamp/stamp.jsp?tp=&arnumber=4082128&isnumber=4082123.

* cited by examiner

SYSTEM AND METHOD FOR CONTENT CREATION VIA INTERACTIVE LAYERS

CROSS-REFERENCE TO RELATED APPLICATION

This non-provisional patent application claims priority under 35 U.S.C. § 119(e) to U.S. Provisional Patent application, Ser. No. 62/983,450, filed Feb. 28, 2020, the disclosure of which is incorporated by reference.

FIELD

This application relates in general to content creation, and in particular to a system and method for content creation via interactive layers.

BACKGROUND

Manually creating deeply detailed content in an n-dimensional space, such as text, environments, visual displays, and other types of simulations and models, is extremely difficult and time consuming. As technology advances, such content generation can be automated. For example, procedural content generation utilizes a set of rules to automate content generation, including text and computer graphics, such as 3D models, for visual displays, rather than manually creating such data. Utilizing procedural generation is beneficial because content is generated much faster utilizing algorithms, than creating the content manually.

However, generators used to create data via procedural generation are often highly specialized in the content to be created. For example, a procedural content generator that simulates erosion caused by water is generally not well versed in generating cloud patterns or a generator that simulates text is not able to generate elevated terrain. Therefore, creating content with different types of characteristics can be difficult and time consuming. Further, the content generated is a single set of data and thus, corrections to the content can be difficult and time consuming because all the data for the content is tied together in a single data set. For example, conventional procedural content generators for text, such as a Twitter bot, generate text content, which is maintained and stored as a single text document. Utilizing the same generator for larger amounts of text content, such as books, generates a single, large dataset that can be hard to change due to the large amount of text. Similarly, simulated environments, such as a virtual world, is generated as a large set of data, which makes modifications difficult, due to finding where the modification should be made and then making the modification.

Accordingly, what is needed is the ability to generate content effectively and flexibly via a set of rules. The content should be easily changeable and have the ability to be quickly reconstructed, while requiring only minimal storage space. Preferably, interactive layers of content are stacked to form an artifact that represents a realistic environment.

SUMMARY

An artifact, such as an environment for a game or map, is generated by creating layers of the environment based on parameters from a user and constraint data from one or more other layers. The environment can simulate a multi-dimensional realistic environment. Specifically, high fidelity environments are created layer by layer and adjusted to support simulations through procedural content generation at each layer. A layer generator associated with each layer can execute procedural content generation to create layer data, which is represented via manipulated data units of a mutable generic object. In a different example, the artifact can include textual content, such as a book, which is generated via layers of data, each representing a chapter of the book, whereas as an environmental simulation can be generated via layers of data that each represent different. A framework organizes, manipulates, and manages the content generation at each layer to create the environment. A DNA modifier, which is a unique string of characters, is assigned to each layer for easy access of the parameters of a layer generator for that layer and recreation of that layer.

One embodiment provides a system and method for content creation via interactive layers. Parameters for creating an artifact are received. A mutable general object on which to build the artifact is maintained and includes a plurality of n-dimensional data units capable of being rendered in a multi-dimensional display. Two or more layers of data for the artifact are separately generated via different generators and each data layer of the artifact represents a different set of characteristics based on different arrangements of the data units. Each data layer is generated by obtaining data regarding information about an arrangement of the data units for that data layer, from one or more data layers of the artifact prior to that data layer, and creating the data layer using procedural content generation to mutate the data units in the mutable general object based on the data from one or more prior data layers and the received parameters. However, in a further embodiment, the data layer may be created based solely on the parameters, independent from the other layers. The artifact is formed by stacking the created data layers via the mutable general object. Each data layer is stored separately with the generator for that data layer as a string of characters.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Glossary

Artifact: content, including one or more of 3D models, images, text, and realistic environments, generated via layers.

Layer generator: responsible for executing a single procedural content generation technique to generate layer data for a particular characteristic of an artifact.

Generic canvas object: a mutable generic object manipulated by each layer generator.

Layer data or data layer or layer: data regarding changes to the generic canvas object for one layer of an artifact that represents a particular characteristic.

Currently, online worlds and environments can be simulated using procedural content generation, which utilizes a set of rules to generate the data, rather than requiring the content to be generated manually. However, procedural content generation is generally specific to producing a specific product as a single data set. Manipulating or recreating such product can be difficult and time consuming. A framework to manage, manipulate, and organize different layers of content, each using procedural content generation, to create an artifact, such as 3D models, images, text, and environments, allows for efficient and easy changes to the artifact, and quick recreation of the layers that is not possible with conventional procedural content generation.

Figure 1:
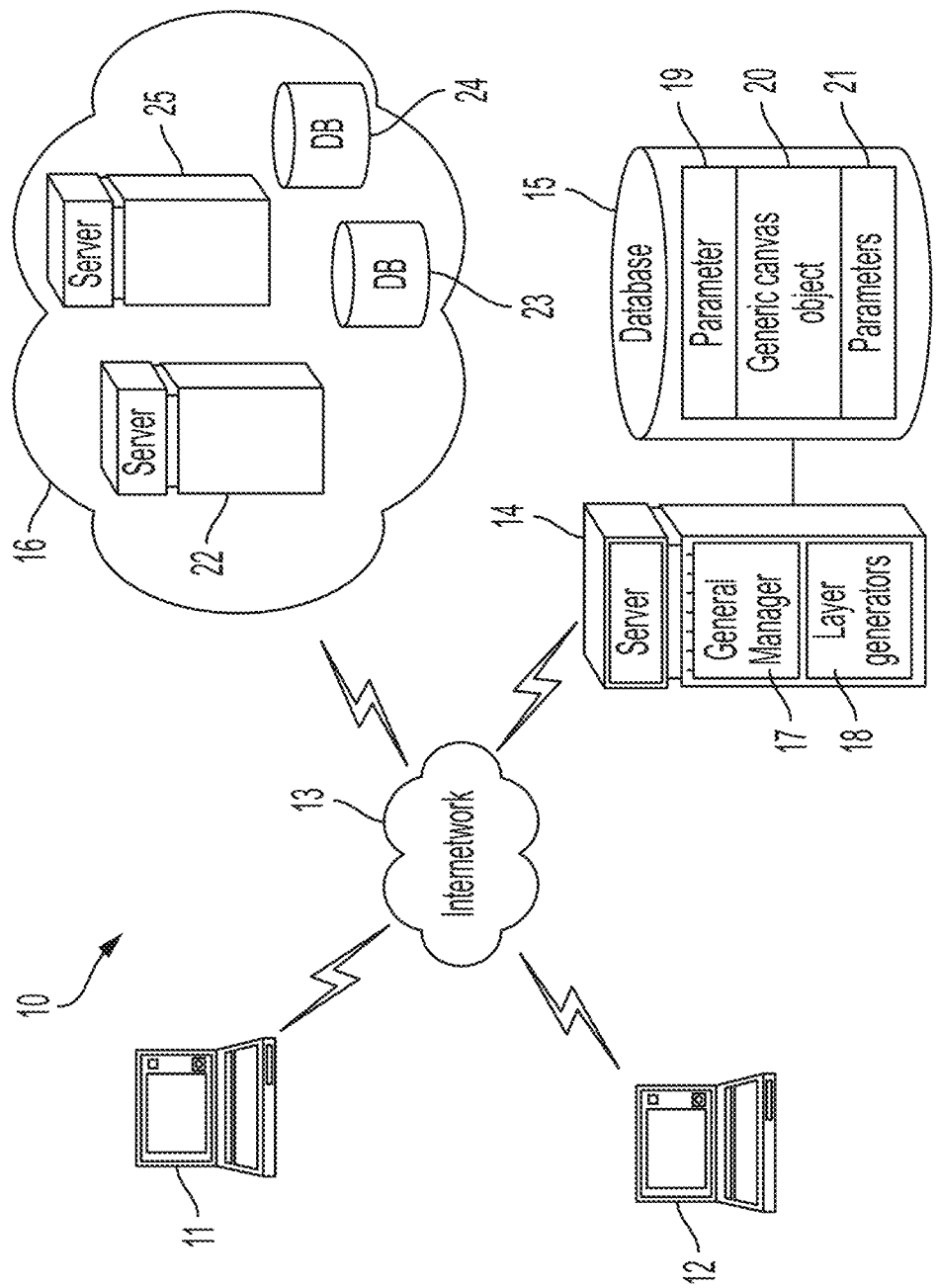
FIG. 1 is a block diagram showing a system for content creation via interactive layers, in accordance with one embodiment.

Layers of content are stacked to create an artifact that is easily manipulated and recreated. FIG. 1 is a block diagram showing a system 10 for content creation via interactive layers, in accordance with one embodiment. Parameters 19 for an artifact are received from a user 11, 12 on a local server 14 or a server 22, 25 in the cloud 16 via an internetwork 13, such as the Internet. In one embodiment, Microsoft Azure or Amazon Web Services can be used for implementing and managing a framework for content creation via interactive layers.

The servers 14, 22, 25 can each include a general manager 17 and layer generators 18. A general manager 17 accepts the user parameters and passes relevant parameters to the layer generators 18. In a further embodiment, two or more general managers can be utilized and in one example, each manager can be responsible for the different types of parameters. The general manager 17 can maintain a list of interactive layers for the artifact and communicate the relevant parameters to the layer managers 18, which are each associated with a different interactive layer on the list. Each layer generator 18 executes a single procedural general content technique using the parameters from the general manager and information, such as constraints 21, from one or more other layer generators 18 to generate layer data for that layer. However, in a further embodiment, multiple general content techniques can be applied per layer.

Each interactive layer of the artifact represents a particular characteristic of the artifact and includes a layer generator and layer data generated via that layer generator. Hereinafter, the terms "layer data" and "data layer" and "layer" are used interchangeably with the same intended meaning, unless otherwise indicated.

The servers can be interconnected or remotely connected to a database 15, 23, 24 on which the parameters 19 received from the user are stored. The databases 15, 23, 24 also each store a generic canvas object 20 and layer constraints 21. The generic canvas object 20 is a mutable generic object that each layer generator operates on during generation. In particular, the generic canvas object includes data units that can be manipulated for each layer to conform with the parameters from the general manager and the layer constraints from other layers. The layers can be built on top of one another, such that the layers are stacked to form the artifact, as further described below with reference to FIGS. 3 and 4.

Each layer, including the generator for that layer and the layer data generated, can be associated with an identifier 26, such as string of characters and stored in at least one of the databases 15, 23, 24 for later access and recreation. Storing each layer of the artifact with the generator takes up less storage space and allows that layer to be quickly generated, as further described below with reference to FIG. 3.

Figure 2:
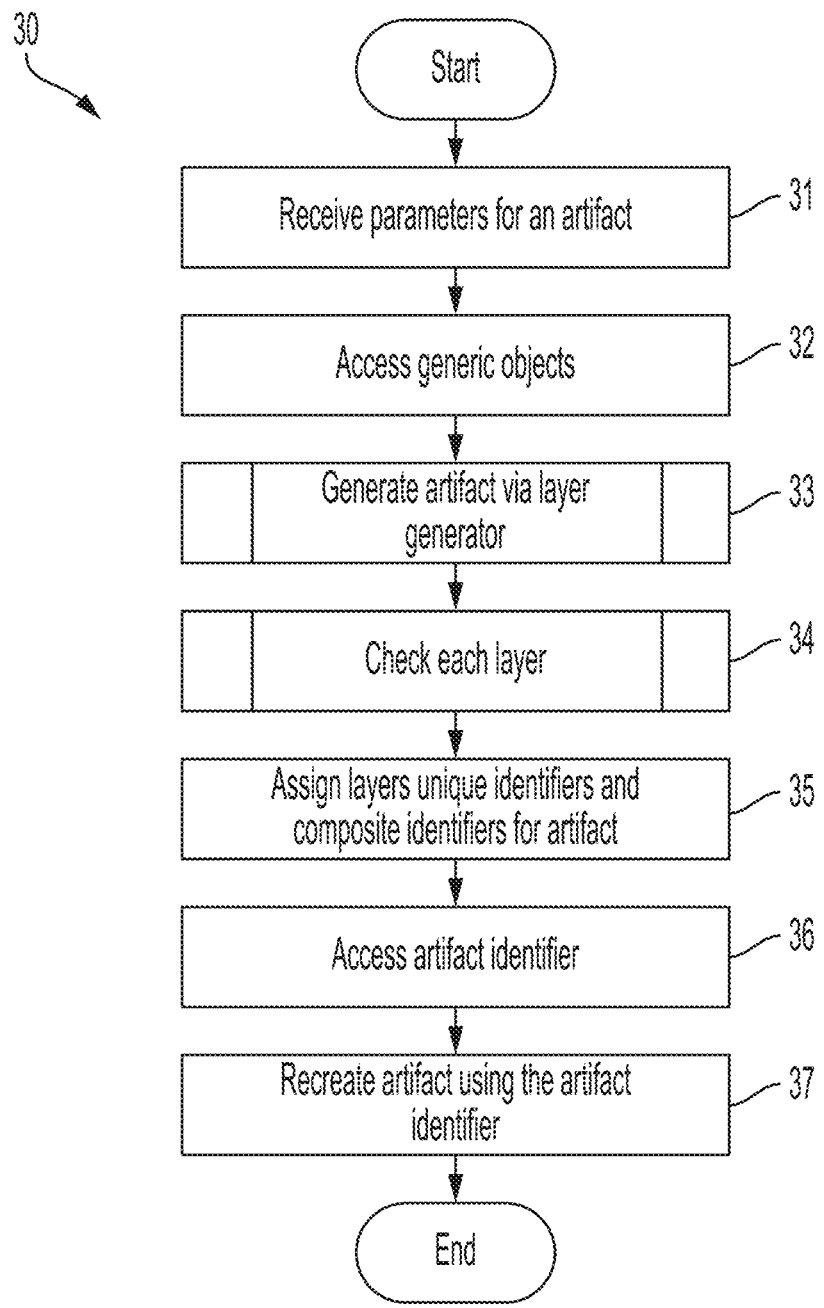
FIG. 2 is a flow diagram showing a method for content creation via interactive layers, in accordance with one embodiment.

The layers are interactive and communicate with one another to form the artifact. The layers are checked to ensure accuracy of the artifact and compliance of the layers. FIG. 2 is a flow diagram showing a method 30 for content creation via interactive layers, in accordance with one embodiment. Parameters are received (step 31) from a user for creating an artifact. A general object is accessed (block 32) on which the artifact will be generated. Subsequently, the artifact is created by generating two or more stacked layers (step 33) by manipulating the general object, as further described below with reference to FIG. 5. During or after generation, each layer of data is checked (step 34) against user defined constraints and the layer constraints, which are encoded in the layer generators associated with other layers, as further described below with reference to FIG. 3. The layer constraints can be stored with the general object and obtained via a third party source. For example, a lake layer for a 3D model of the great lakes can include lake size and water level from the National Oceanic and Atmospheric Administration.

Figure 5:
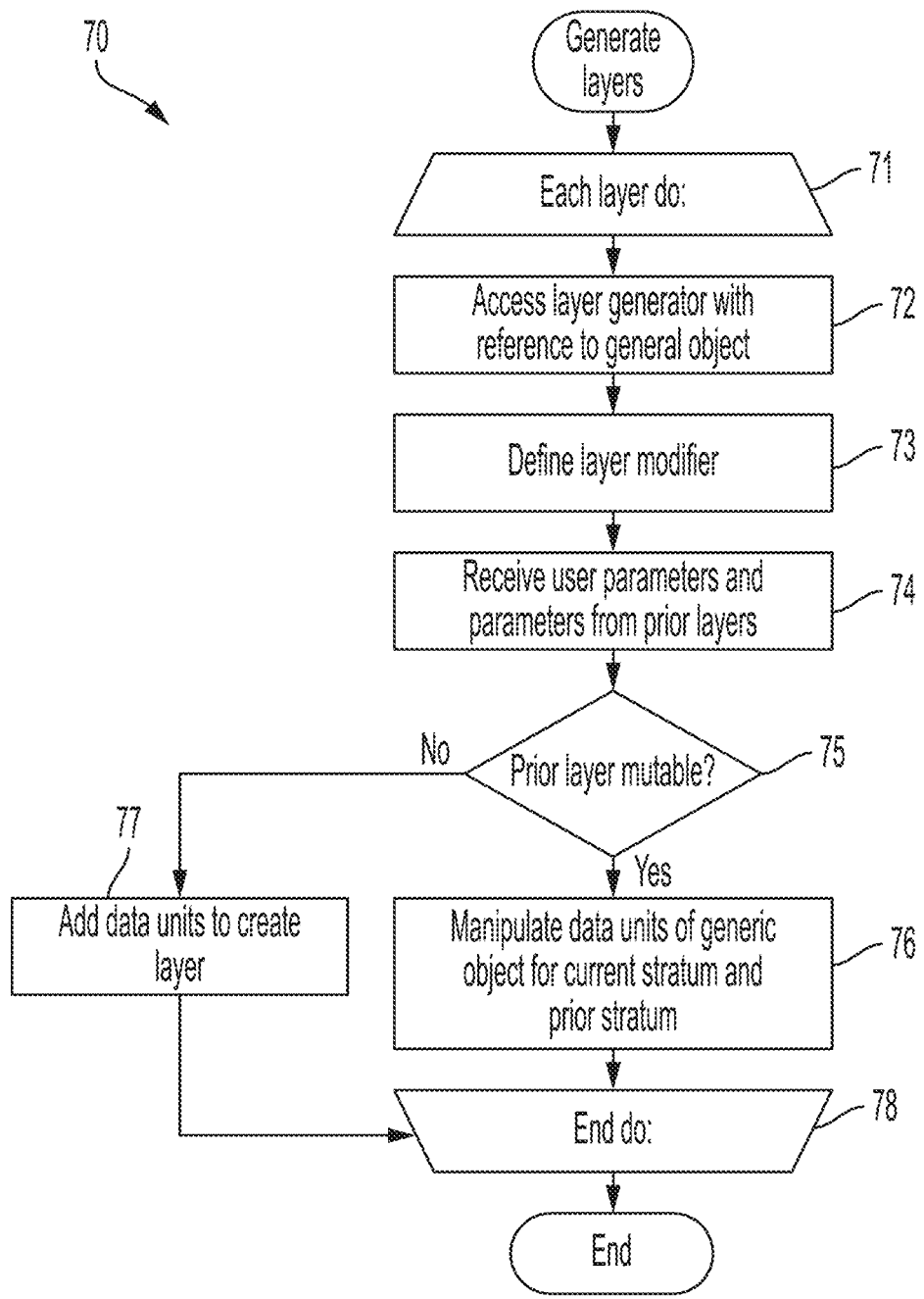
FIG. 5 is a flow diagram showing, by way of example, a method for generating a data layer of an artifact.

Each layer, including the layer data and layer generator for that layer, are assigned (step 35) a unique identifier, as further described in detail below with respect to FIG. 5. The identifiers for the layers can be composited for the artifact and stored. Storing the parameters of each layer via the separate identifiers, which are composited as a DNA modifier of the artifact, rather than storing the actual layer data as part of the complete artifact, greatly reduces an amount of storage space required and provides access to the parameters of the layer for modification or recreation of that layer. Also, the artifact can be easily recreated (step 37) by accessing (step 36) the composited identifier for the artifact and utilizing the generators and the layer data for each layer to reconfigure the artifact.

Figure 3:
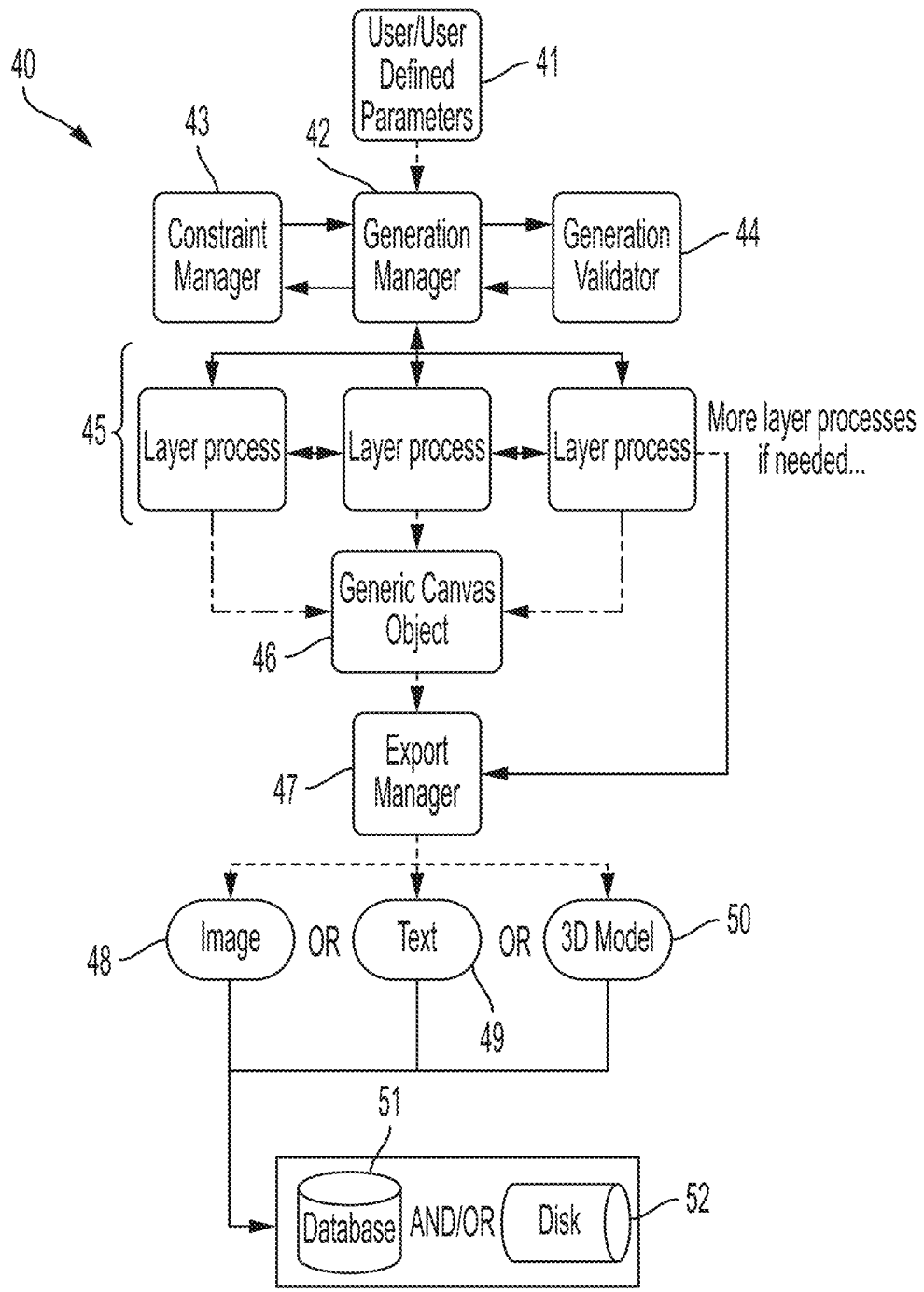
FIG. 3 is a flow diagram showing, by way of example, components for creating an artifact.

Artifacts are content generated via interactive layers of data and provide realistic visual displays, such as video games, maps, films and multi-dimensional environment simulations. FIG. 3 is a flow diagram showing, by way of example, components for creating an artifact. A user provides a set of parameters for generating the environmental environment, such as dimensions of the environment. Other types of parameters 41 are possible, including characteristics of the environment, such as altitude, temperature, and global moisture value. However, other types of characteristics are possible, such as beats per minute or specific notes for sound artifacts, and language or font for text artifacts. The parameters are provided to a generation manager 42, which provides relevant parameters to each layer for generation of the layer data, as well as to a constraint manager 43 and generation validator 44. The generation manager maintains a list of the different layers, orders the layers, and can set constraints to make sure each layer is correctly represented. The generation manager can also provide a reference to the generic canvas object, to each of the layer generators.

Once the information from the generation manager is received, each layer generator creates a layer of data for a particular characteristic by performing a layer process 45 during which a single procedural content generation technique is executed using the parameters from the generation manager and constraints from other layers to mutate a generic canvas object 46. The generic canvas object is a mutable generic object on which each layer generator will operate to generate the layer data.

The layer data for different layers can be generated simultaneously or sequentially. For the elevated map artifact, the data layers can include a flat base terrain, water, terrain type, trees, and roads and buildings. Other layer data types are possible. When the data layers are generated simultaneously, the layer data is later stacked by the generation manager and modifications are made to the layers based on the constraints of other layers. Alternatively, when the processes are stacked, the artifact is generated by building the data layers on top of one another, from a bottom to top orientation. For example, the base terrain can define a bottom layer and the water layer can be built on top of the base terrain by manipulating the terrain to insert river, ponds, lakes, and other types of water, if applicable for the environment. In a further embodiment, a top to bottom orientation is also possible.

Figure 4:
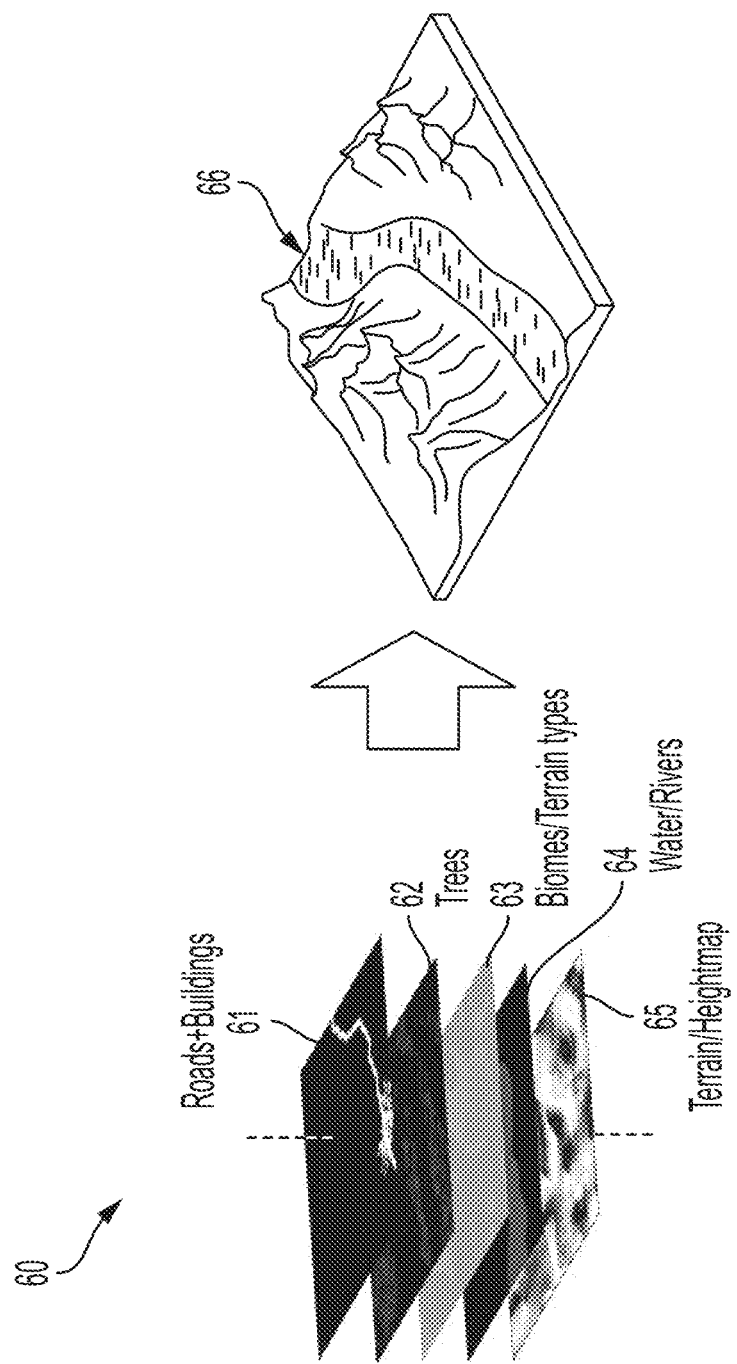
FIG. 4 is a block diagram showing, by way of example, an artifact generated via the system of FIG. 1 and method of FIG. 2.

The layers, whether generated simultaneously or sequentially, are stacked to form the artifact. FIG. 4 is a block diagram 60 showing, by way of example, an artifact 66 generated via the system of FIG. 1 and method of FIG. 2. Based on the data layers described above with respect to FIG. 4, the data layers 61-65 for an elevated map artifact can include a base terrain layer 65, a water layer 64 stacked on top of the terrain layer 65, a terrain type layer 63 that defines a type of terrain, such as desert, rain forest, or other type of terrain, built on top of the water layer 64, a tree layer 62 built over the terrain type layer 63, and a road and building layer 61 built over the tree layer 62. Once stacked, the data layers form the elevated map artifact 66.

Returning to the discussion with respect to FIG. 3, the generation manager 42 can add, remove, or reorder the different data layers of the artifact, which requires checking of all the other data layers to ensure that the constraints and parameters of each layer are met. Regardless of whether the generation manager makes changes to the data layers after generation, the constraint manager 43 reviews the data layer to ensure that the constraints and dependencies of other data layers are respected. The generation validator 44 checks each layer data for each layer to ensure the data is valid. A data layer is valid when the data layer satisfies user defined constraints and layer generators for other data layers are not in conflict based on the modifications made by the that data layer. If the data layers satisfy the reviews by the constraint manager 43 and the generation validator 44, the generation manager invokes an export manager 47 to read the generic canvas object and save the results, which include all the layer data written by the generic canvas object and composited as the final artifact. The artifact can be saved as an image 48, text 49, 3D model 50, or series of files (not shown) to a disk 52, database 51, or other type of storage medium.

Generating the artifact via interactive layers allows the artifact to be easily changed, stored, and recreated. FIG. 5 is a flow diagram showing, by way of example, a method 70 for generating the layers. For each layer (step 71), a layer generator associated with that layer is accessed (step 72). A layer identifier is defined (step 73) via the layer generator and is specific to that layer. The layer identifier is a string of characters that encode a random number generator seed value and other parameters for the layer to use during the generation process. Below is an example of an identifier with a string of characters and values that can be used to represent a single layer:

[ . . . , "{seed}/{layer generator code}_{parameter id}: {value}", . . . ], wherein seed represents a seed value that is utilized by a random number generator included with the layer's generator. A layer generator code is an internal use code associated with the layer generator for identification and a parameter id is a number associated with a specific parameter relevant to that layer, while value is a value assigned to the layer's parameter. In the above example, only one parameter is shown; however, the layer can be associated with multiple parameters, which are all represented in the modifier. An example of a parameter specific to a layer can include a percentage of moss at a particular moisture level on a terrain. Other examples are possible. When a user wants to make changes to a layer, the modifier can be edited for that layer.

The identifiers for each layer can be composited into a modifier having single string of identifiers for the artifact and stored for later access and recreation of the artifact. A first element in the modifier string can also include the overall artifact parameters and can be separated from a first modifier by a "|," as shown below:

["{scenario generator code}_{scenario parameter id}: {value} . . . _{scenario parameter id}:{value}|{seed}{1st layer generator code}_{layer generator parameter id}: {value}", . . . ]

The scenario generator code is an internal use code associated with the overall generation process of the artifact. The scenario parameter id is an internal use code associated with a parameter for the artifact and the value is a value assigned to the artifact parameter. Examples of parameters for a sound artifact can include overall sound and file duration, whereas examples of parameters for an elevated map can include dimension of the map or a maximum elevation of the map. Other parameters are possible. The identifier string can include one or more parameters for the artifact. The modifiers allow different users to reproduce the space and characteristics associated with that layer, including a specific instance of a configuration of the layer, using the same or similar generic canvas object, as well as reducing an amount of data storage required.

User parameters, and parameters and constraints from one or more prior data layers are received (step 74) by the layer generator for creating the layer data. Based on the parameters and constraints from at least the prior level, a determination is made (step 75) as to whether the prior data layer is mutable. If so, the data units of the generic canvas object are manipulated (step 76), such as by adding data units to the prior data layer, removing data units from the prior data layer, and forming assemblies of data units for the current data layer. Other types of data unit manipulations are possible. For example, a water layer formed on top of a base terrain layer may require cutouts within the terrain layer, such as by removal of data units, to create depth of a particular body of water.

However, if the prior data layer is not mutable (step 75), the data units associated with the prior data layer cannot be manipulated, such as by removal or changing data unit types. However, data units can be added (block 77) on top of the prior data layer to form the current data layer for the layer. For example, a cold weather layer, such as ice and snow, being formed on top of an elevated terrain layer, such as mountains and hills, may determine that the elevated terrain layer cannot be mutated and thus, the ice and snow is merely added, by adding data units on top of the elevated terrain data units. The process (steps 72-77) are performed for generating the data layer of each layer and upon generating the last, or top data layer, of the artifact, the generation process ends (block 78). The manipulation of the data units can be performed by the layer generator, which is trained to utilize a set of rules that recognizes characteristics of that layer. In one embodiment, the characteristics can represent a type of terrain or object, such as grass, water, mountains, trees, roads, people, buildings, or other types of terrain and objects. For example, a water layer can be associated with a layer generator that is trained to identify areas of terrain for correct placement of bodies of water. For example, a waterfall would not flow from low terrain to high terrain and a sea would not be placed at high terrain. Training data for the water layer generator can include maps and other related data.

Sometimes, one or more layer generators must negotiate with one another, such as when changes by one layer generator to layer data of a different layer generator requires approval or consideration. For example, if a road layer generator is placing roads and must traverse a river or other body of water, the road layer generator should negotiate with the water layer generator and a lower level terrain layer to determine how the road should be placed since a road cannot be built on water. During the negotiation, the solution agreed upon by the water, road, and terrain layer generators may be digging into the terrain and water layers to build a culvert over which the road can be placed.

A specific example of generating an environment artifact can use Nixel Worlds as the generic canvas object, which includes and manages voxels, as well as assemblies of voxels. Nixel Worlds has a 3D array that includes voxels and empty positions, and has methods for adding, removing, and editing the voxels. Other functions for counting and accessing specific voxels and their positions can also be included in Nixel Worlds. Similarly, functions for adding, removing, editing, counting, and accessing specific assemblies of voxels are also available.

A voxel is an atomic unit used in the layer generation process that is stored and managed by the Nixel World. Each voxel has a position, size, type, and value, and can be extended to have more or less attributes. Thus, Nixel Worlds can be capable of n dimension procedural content generation, where n is a number of voxel attributes. In this example, there can be four basic voxel types, including water, object, assembly, and terrain. However, more or less types of voxels are possible. Each type of voxel is associated with unique attributes and can expand the space of the artifact generated. In one embodiment water and terrain voxel types have "value" and "type" attributes. In one example, the value attribute can be moisture level with respect to how close a terrain voxel is to a water source and the type attribute can include a type of the terrain voxel, such as rainforest, desert, field, or other terrain type. Assembly type voxels are associated with a reference to an assembly of which the assembly voxel is included. For example, an assembly type voxel can be part of a building assembly and can represent a brick, while other assembly type voxels in the building may represent a door or window. Further, object type voxels can be extended to represent higher complexity single voxel entities, such as an individual performing tasks within a layer.

Assemblies include two or more assembly voxels that represent objects larger than a single voxel position can handle. For example, an assembly could represent a cloud, tree, or house. Other assembly representation types are possible. A cloud voxel assembly can be associated with a water content attribute, a tree voxel can be associated with an attribute that represents a number of applies growing on the tree, and a house can be associated with an attribute that identifies an owner of the house.

The voxels and voxel assemblies are manipulated during processing of each layer. Each layer generator has a reference to the Nixel World that allows a generator to manipulate the voxels and reason about a current world state that can inform a procedural content generation process during its generation. Each layer generator includes a priority attribute that dictates where and when in the scenario generation process of the artifact, that generator is executed to create the associated layer data.

In this example, one of the implemented layer generators is a biome layer generator that is responsible for assigning terrain types, such as forest, desert, or seabed, as well as other types, by utilizing a Whittaker diagram that is based on elevation generated by a terrain layer generator, a user defined global moisture, ocean level, and global temperature, as well as Simplex Noise. The terrain voxels that represent high elevations, high moisture, and low temperature values are assigned a "snow" type, while terrain voxels at ocean level with high moisture and high temperature values are assigned a "rainforest" type. Other layer generators, such as a tree generator, can reference the values from the terrain voxels through an associated reference to Nixel World to inform their own generation process.

The layers in Nixel can operate and negotiate in a shared n-dimensional configuration space, where each new layer added, following its generative algorithm, is interacting with other layers in the same global configuration space. For instance, if a surface water layer for rivers, lakes, and other bodies of water were to be placed on a terrain layer, the surface water layer generator would need to remove surface features to accommodate the water representing a river that carves out a river bed.

If a layer is mutable, then other layers may alter that layer freely, in accordance with parameters of the mutable layer. However, if the layer is immutable, the layer cannot be changed and other layers must treat the immutability of the layer as a constraint. In one embodiment, negotiations can occur to maintain some local or global constraint that affects layers, such that layer adjustments may need to be made by coordinating generative algorithms to maintain constraints. A constraint manager can help facilitation the negotiations between layer interactions.

Once completed, results of the environment generated are packed in a series of PNG height map images with three channels of colors encoding a voxel's elevation, type, and value. However, other formats of the results and other channels of colors are possible for coding the voxel's different characteristics. Voxel data can be read from the Nixel World, while the generation manager extracts more complex information, such as multiple positions, descriptions, and assemblies of the voxels, and saves the information within a set of human readable JSON files.

In another example, a Mars-like environment can be generated for simulating that particular hardware and software will work on the terrain. The environment simulation can include a terrain layer generator utilizing Simplex Noise and Voronoi tessellations to generate a basic landscape with mountains and hills that rise in elevation the closer the elevated areas are to a Voronoi cell center. The basic landscape can be defined as a base terrain data layer of the artifact. Another layer generator can cover parts of terrain in ice using a Simplex Noise texture and the elevations generated by the previous terrain layer generator. The ice data layer sits directly atop the terrain data layer using Simplex Noise, which can generate patches of ice for that layer. A further layer generator, useful for simulation or games, can be responsible for assigning slices of land for anomalies in which a Mars Rover might have interest for examining mineral deposits to collect and scan. The voxels in the simulation data layer can define possible sensor readings and add randomized physical elements. Finally, a last layer generator can be responsible for laying out potential paths across the generated terrain data layer that a rover should avoid travelling through, such as patches of ice, as well as steep slopes. The aggregate of all the generated layers for the Mars-like artifact provides useful, environmentally embedded information for artificial intelligence planning. Thus, the resulting artifact comprised of the different data layers, is a useful stack of simulation data for a Mars rover simulator or game.

In a further embodiment, content creation via interactive layers can also be utilized to generate text. For example, a layer generator can be a text generator and the data unit associated with a generic object can represent letters for an artifact, which can include a text collection. Also, the assembly of data units can represent a collection of letters in a word. During textual procedural content generation, the generic canvas object can manage a string, with helper functions for accessing and changing specific characters and words. For example, an instruction can include "access the character in the fifth index of the string." The textual layer generator can perform a Caesar shift on the string stored in the Generic Canvas Object and the generation manager can add a "to-uppercase" layer process after the Caesar shift layer process. Finally, the export manager can save the string to a text file.

While the invention has been particularly shown and described as referenced to the embodiments thereof, those skilled in the art will understand that the foregoing and other changes in form and detail may be made therein without departing from the spirit and scope of the invention.

What is claimed is:

1. A system for content creation via interactive layers, comprising:
    a database to store a mutable general object on which to build an artefact, wherein the mutable general object comprises a plurality of n-dimensional data units capable of being rendered in a multi-dimensional display;
    at least one server comprising a central processing unit, memory, an input port to receive the mutable general object from the database, and an output port, wherein the central processing unit is configured to:
    receive parameters for creating the artefact;
    generate layers for the artefact, wherein each layer of the artefact represents a different feature of the artefact based on different arrangements of the data units of the mutable general object associated with the artefact, each layer comprising:
        obtain for one of the layers of the artefact, data from at least one of the other layers located prior to the one layer, wherein the data comprises information about an arrangement of the data units for the prior layers; and
        create the layer by using procedural content generation to mutate the data units in the mutable general object based on the data from one or more of the prior layers and the received parameters;
    compile the created layers into the artefact via the mutable general object; and
    store the artefact as a string of characters for each layer.

2. A system according to claim 1, further comprising:
    a generation manager configured to perform at least one of the following:
        receive a list of the layers of the artefact and ordering the layers in the list;
        set constraints for each layer and ensuring that each layer conforms with that constraint; and
        check that each layer is consistent with the other layers and if not, changing the parameters of one or more of the layers until the layers are consistent.

3. A system according to claim 1, wherein each layer is comprised of voxels and each voxel is associated with a voxel type and comprises an n number of attributes.

4. A system according to claim 1, wherein the central processing unit generates a seed value for each layer via a random number generator.

5. A system according to claim 4, wherein the string of characters for each layer encode the seed value for that layer, the received parameters, and parameters associated with that layer.

6. A system according to claim 5, wherein the central processing unit recreates the layers upon accessing the string of characters.

7. A system according to claim 1, wherein the central processing unit receives further parameters for an additional layer of the artefact and creates the additional layer using the further received parameters.

8. A system according to claim 1, wherein during the mutating of the data units of the mutable general object during the creating of the layer, the central processing unit performs the following:
    determine whether at least one of the prior layers are mutable; and
    when mutable, manipulate the data units of the at least one prior layer comprising one of remove at least a portion of the data units in the prior layer or change a type of a portion of the data units in the prior layer.

9. A system according to claim 1, wherein during the mutating of the data units of the mutable general object during the creating of the layer, the central processing unit performs the following:
    determine whether at least one of the prior layers are mutable upon generating the layer; and
    when the prior layer is not mutable, add data units on top of the prior data layer to form the data layer.

10. A system according to claim 1, wherein the central processing unit removes one of the layers from the artefact and adjusts the remaining layers of the artefact.

11. A method for content creation via interactive layers, comprising:
    receiving parameters for creating an artefact;
    maintaining a mutable general object on which to build the artefact, wherein the mutable general object comprises a plurality of n-dimensional data units capable of being rendered in a multi-dimensional display;
    generating layers for the artefact, wherein each layer of the artefact represents a different feature of the artefact based on different arrangements of the data units of the mutable general object associated with the artefact, each layer comprising:
        obtaining for one of the layers of the artefact, data from at least one of the other layers located prior to the one layer, wherein the data comprises information about an arrangement of the data units for the prior layers; and
        creating the layer by using procedural content generation to mutate the data units in the mutable general object based on the data from one or more of the prior layers and the received parameters;

compiling the created layers into the artefact via the mutable general object; and storing the artefact as a string of characters for each layer.

12. A method according to claim 11, further comprising:
maintaining a generation manager configured to perform at least one of the following:
receiving a list of the layers of the artefact and ordering the layers in the list;
setting constraints for each layer and ensuring that each layer conforms with that constraint; and
checking that each layer is consistent with the other layers and if not, changing the parameters of one or more of the layers until the layers are consistent.

13. A method according to claim 11, wherein each layer is comprised of voxels and each voxel is associated with a voxel type and comprises an n number of attributes.

14. A method according to claim 11, further comprising:
generating a seed value for each layer via a random number generator.

15. A method according to claim 14, wherein the string of characters for each layer encode the seed value for that layer, the received parameters, and parameters associated with that layer.

16. A method according to claim 15, further comprising:
recreating the layers upon accessing the string of characters.

17. A method according to claim 11, further comprising:
during the mutating of the data units of the mutable general object during the creating of the layer, performing the following:
determining whether at least one of the prior layers are mutable; and
when mutable, manipulating the data units of the at least one prior layer comprising one of removing at least a portion of the data units in the prior layer or changing a type of a portion of the data units in the prior layer.

18. A method according to claim 11, further comprising:
during the mutating of the data units of the mutable general object during the creating of the layer, performing the following:
determining whether at least one of the prior layers are mutable upon generating the layer; and
when the prior layer is not mutable, adding data units on top of the prior data layer to form the data layer.

19. A method according to claim 11, further comprising:
removing one of the layers from the artefact; and
adjusting the remaining layers of the artefact.

20. A non-transitory computer readable storage medium storing code for executing on a computer system to perform the method comprising:
receiving parameters for creating an artefact;
maintaining a mutable general object on which to build the artefact, wherein the mutable general object comprises a plurality of n-dimensional data units capable of being rendered in a multi-dimensional display;
generating layers for the artefact, wherein each layer of the artefact represents a different feature based on different arrangements of the data units, each layer comprising:
obtaining for one of the layers of the artefact, data from at least one of the other layers prior to the one layer, wherein the data comprises information about an arrangement of the data units for the prior layers; and
creating the layer by using procedural content generation to mutate the data units in the mutable general object based on the data from one or more of the prior layers and the received parameters;
compiling the created layers into the artefact via the mutable general object; and
storing the artefact as a string of characters for each layer.

* * * * *